United States Patent
Chatterjee et al.

(10) Patent No.: US 12,244,631 B2
(45) Date of Patent: Mar. 4, 2025

(54) METHOD AND SYSTEM FOR DETECTING OUTLIERS IN PROCESSES

(71) Applicant: BULL SAS, Les Clayes-sous-bois (FR)

(72) Inventors: Amarnath Chatterjee, Bangalore (IN); Rajat Mohanty, Fairfax, VA (US)

(73) Assignee: BULL SAS, Les Clayes-sous-Bois (FR)

( * ) Notice: Subject to any disclaimer, the term of this patent is extended or adjusted under 35 U.S.C. 154(b) by 236 days.

(21) Appl. No.: 17/960,084

(22) Filed: Oct. 4, 2022

(65) Prior Publication Data
US 2023/0164161 A1 May 25, 2023

(30) Foreign Application Priority Data
Oct. 4, 2021 (EP) ..................................... 21200770

(51) Int. Cl.
*H04L 9/40* (2022.01)
*G06F 18/23213* (2023.01)

(52) U.S. Cl.
CPC .... *H04L 63/1433* (2013.01); *G06F 18/23213* (2023.01); *H04L 63/1425* (2013.01)

(58) Field of Classification Search
None
See application file for complete search history.

(56) References Cited

U.S. PATENT DOCUMENTS

| | | | |
|---|---|---|---|
| 10,628,834 B1* | 4/2020 | Agarwal | G06N 20/00 |
| 11,080,307 B1* | 8/2021 | Holub | G06F 16/285 |
| 2020/0064444 A1* | 2/2020 | Regani | G01S 7/006 |
| 2022/0272116 A1* | 8/2022 | Li | G16Y 10/75 |

OTHER PUBLICATIONS

European Search Report issued in EP21200770, dated Mar. 11, 2022 (1 page).
Koenig, et al., "Cluster security with NVisionCC: process monitoring by leveraging emergent properties", Cluster Computing and the Grid, 2005; IEEE International Symposium on Cardiff, Wales (12 pages).

(Continued)

*Primary Examiner* — Trang T Doan
(74) *Attorney, Agent, or Firm* — ARC IP Law, PC; Joseph J. Mayo

(57) ABSTRACT

A method for detecting outliers in processes running in a group of machines. A clustering stage, carried out at a first frequency, including fetching a list of software contained in all machines, calculating tf-idf value for each installed software and for each machine, performing clustering of the machines by applying a clustering algorithm and using a Jaccardian weighted distance method between machines based on the tf-idf values. A preliminary outliers detection stage, carried out at a second frequency greater than the first frequency, including fetching information of processes running in the machines, for each cluster calculating tf-idf values for each process, wherein if a tf-idf value is greater than a first predetermined threshold, the process is considered as outlier, for all clusters calculating itf-idf value for each process considered as outlier, and if a itf-idf value is lower than a second predetermined threshold, the process is confirmed as outlier.

14 Claims, 8 Drawing Sheets

(56) References Cited

OTHER PUBLICATIONS

Buyukkayhan, et al., "Lens on the Endpoint: Hunting for Malicious Software Through Endpoint Data Analysis" Oct. 12, 2017; Advances in Biometrics; International Conference, ICB 2007(25 pages).
Shah, et al., "Document Clustering: a Detailed Review", International Journal of Applied Information Systems; vol. 4, No. 5, Oct. 1, 2012 (9 pages).

* cited by examiner

| Process | Endpoint-1 | | | | Endpoint-2 | | | | Endpoint-3 | | | | Endpoint-4 | | | | Endpoint-5 | | | |
|---|---|---|---|---|---|---|---|---|---|---|---|---|---|---|---|---|---|---|---|---|
| | n | tf | idf | tf-idf | n | tf | idf | tf-idf | n | tf | idf | tf-idf | n | tf | idf | tf-idf | n | tf | idf | tf-idf |
| SearchUI.exe | | 1 | 0.016 | 0.000 | 0.000 | 0 | 1 | 0.011 | 0.000 | 0.000 | 0 | 1 | 0.014 | 0 | 0 | 0 | 1 | 0.015 | 0 | 0 | 0 | 1 | 0.011 | 0 | 0 |
| svchost.exe | | 21 | 0.344 | 0.000 | 0.000 | 0 | 32 | 0.360 | 0.000 | 0.000 | 0 | 14 | 0.194 | 0 | 0 | 0 | 12 | 0.765 | 0 | 0 | 0 | 25 | 0.274 | 0 | 0 |
| conhost.exe | | 16 | 0.262 | 0.000 | 0.000 | 0 | 20 | 0.225 | 0.000 | 0.000 | 0 | 28 | 0.389 | 0 | 0 | 0 | 25 | 0.308 | 0 | 0 | 0 | 32 | 0.337 | 0 | 0 |
| mmc.exe | | 1 | 0.016 | 0.000 | 0.000 | 0 | 3 | 0.034 | 0.000 | 0.000 | 0 | 1 | 0.014 | 0 | 0 | 0 | 1 | 0.015 | 0 | 0 | 0 | 1 | 0.011 | 0 | 0 |
| TrustedInstaller.exe | | 3 | 0.049 | 0.000 | 0.000 | 0 | 5 | 0.056 | 0.000 | 0.000 | 0 | 2 | 0.028 | 0 | 0 | 0 | 1 | 0.015 | 0 | 0 | 0 | 1 | 0.011 | 0 | 0 |
| chrome.exe | | 5 | 0.082 | 0.000 | 0.000 | 0 | 15 | 0.169 | 0.000 | 0.000 | 0 | 12 | 0.167 | 0 | 0 | 0 | 3 | 0.044 | 0 | 0 | 0 | 5 | 0.053 | 0 | 0 |
| teams.exe | | 6 | 0.098 | 0.000 | 0.000 | 0 | 5 | 0.056 | 0.000 | 0.000 | 0 | 6 | 0.083 | 0 | 0 | 0 | 6 | 0.088 | 0 | 0 | 0 | 6 | 0.063 | 0 | 0 |
| vcpkg.exe | | 1 | 0.016 | 0.222 | 0.003564 | 0 | 3 | 0.034 | 0.222 | 0.007748 | 0 | 1 | 0.014 | 0.221849 | 0.003081 | 0 | 0 | 0.000 | 0.221849 | 0 | 0 | 0 | 0.000 | 0.221849 | 0 |
| perfwatson2.exe | | 1 | 0.016 | 0.222 | 0.003564 | 0 | 1 | 0.011 | 0.222 | 0.002749 | 0 | 1 | 0.014 | 0.221849 | 0.003081 | 0 | 0 | 0.000 | 0.221849 | 0 | 0 | 0 | 0.000 | 0.221849 | 0 |
| dockerd.exe | | 3 | 0.049 | 0.222 | 0.010991 | 0 | 1 | 0.011 | 0.222 | 0.002749 | 0 | 3 | 0.042 | 0.221849 | 0.009244 | 0 | 0 | 0.000 | 0.221849 | 0 | 0 | 0 | 0.000 | 0.221849 | 0 |
| sqlcep.exe | | 2 | 0.033 | 0.222 | 0.00727 | 0 | 2 | 0.022 | 0.222 | 0.004499 | 0 | 2 | 0.028 | 0.221849 | 0.006162 | 0 | 0 | 0.000 | 0.221849 | 0 | 0 | 0 | 0.000 | 0.221849 | 0 |
| swnchache.exe | | 1 | 0.016 | 0.222 | 0.003564 | 0 | 1 | 0.011 | 0.222 | 0.002249 | 0 | 1 | 0.014 | 0.221849 | 0.003081 | 0 | 0 | 0.000 | 0.221849 | 0 | 0 | 0 | 0.000 | 0.221849 | 0 |
| TabTip.exe | | 0 | 0.000 | 0.398 | 0 | 0 | 0 | 0.000 | 0.398 | 0 | 0 | 0 | 0.000 | 0.39794 | 0 | 0 | 1 | 0.015 | 0.39794 | 0.005852 | 0 | 1 | 0.011 | 0.39794 | 0.004189 |
| Anydesk.exe | | 0 | 0.000 | 0.398 | 0 | 0 | 0 | 0.000 | 0.398 | 0 | 0 | 0 | 0.000 | 0.39794 | 0 | 0 | 3 | 0.044 | 0.39794 | 0.017556 | 0 | 3 | 0.034 | 0.39794 | 0.013511 |
| fsnttray.exe | | 0 | 0.000 | 0.398 | 0 | 0 | 0 | 0.000 | 0.398 | 0 | 0 | 0 | 0.000 | 0.39794 | 0 | 0 | 1 | 0.015 | 0.39794 | 0.005852 | 0 | 1 | 0.011 | 0.39794 | 0.004189 |
| Excel.exe | | 0 | 0.000 | 0.398 | 0 | 0 | 0 | 0.000 | 0.398 | 0 | 0 | 0 | 0.000 | 0.39794 | 0 | 0 | 6 | 0.088 | 0.39794 | 0.035112 | 0 | 11 | 0.116 | 0.39794 | 0.046277 |
| fortiesnac.exe | | 0 | 0.000 | 0.398 | 0 | 0 | 0 | 0.000 | 0.398 | 0 | 0 | 0 | 0.000 | 0.39794 | 0 | 0 | 1 | 0.015 | 0.39794 | 0.005852 | 0 | 1 | 0.011 | 0.39794 | 0.004189 |
| ciscowebex.exe | | 0 | 0.000 | 0.398 | 0 | 0 | 0 | 0.000 | 0.398 | 0 | 0 | 0 | 0.000 | 0.39794 | 0 | 0 | 1 | 0.015 | 0.39794 | 0.005852 | 0 | 1 | 0.011 | 0.39794 | 0.004189 |

FIG. 6

| Cluster | Cluster-1 | | | | | | | | | | | |
|---|---|---|---|---|---|---|---|---|---|---|---|---|
| Process | Endpoint-1 | | | | Endpoint-2 | | | | Endpoint-3 | | | |
| | n | tf | idf | tf-idf | n | tf | idf | tf-idf | n | tf | idf | tf-idf |
| SearchUI.exe | 1 | 0,016 | 0,000 | 0 | 1 | 0,011 | 0,000 | 0 | 1 | 0,014 | 0 | 0 |
| svchost.exe | 21 | 0,344 | 0,000 | 0 | 32 | 0,360 | 0,000 | 0 | 14 | 0,194 | 0 | 0 |
| conhost.exe | 16 | 0,262 | 0,000 | 0 | 20 | 0,225 | 0,000 | 0 | 28 | 0,389 | 0 | 0 |
| mmc.exe | 1 | 0,016 | 0,000 | 0 | 3 | 0,034 | 0,000 | 0 | 1 | 0,014 | 0 | 0 |
| TrustedInstaller.exe | 3 | 0,049 | 0,000 | 0 | 5 | 0,056 | 0,000 | 0 | 2 | 0,028 | 0 | 0 |
| chrome.exe | 5 | 0,082 | 0,000 | 0 | 15 | 0,169 | 0,000 | 0 | 12 | 0,167 | 0 | 0 |
| teams.exe | 6 | 0,098 | 0,000 | 0 | 5 | 0,056 | 0,000 | 0 | 6 | 0,083 | 0 | 0 |
| vcpkrg.exe | 1 | 0,016 | 0,000 | 0 | 3 | 0,034 | 0,000 | 0 | 1 | 0,014 | 0 | 0 |
| perfwatson2.exe | 1 | 0,016 | 0,000 | 0 | 1 | 0,011 | 0,000 | 0 | 1 | 0,014 | 0 | 0 |
| dockerd.exe | 3 | 0,049 | 0,000 | 0 | 1 | 0,011 | 0,000 | 0 | 3 | 0,042 | 0 | 0 |
| sqlciep.exe | 2 | 0,033 | 0,000 | 0 | 2 | 0,022 | 0,000 | 0 | 2 | 0,028 | 0 | 0 |
| tsvnchache.exe | 1 | 0,016 | 0,000 | 0 | 1 | 0,011 | 0,000 | 0 | 1 | 0,014 | 0 | 0 |
| | 61 | | | | 89 | | | | 72 | | | |

| | Cluster-2 | | | | | | | |
|---|---|---|---|---|---|---|---|---|
| Process | Endpoint-4 | | | | Endpoint-5 | | | |
| | n | tf | idf | tf-idf | n | tf | idf | tf-idf |
| SearchUI.exe | 1 | 0,015 | 0 | 0 | 1 | 0,014 | 0 | 0 |
| svchost.exe | 18 | 0,265 | 0 | 0 | 26 | 0,356 | 0 | 0 |
| conhost.exe | 25 | 0,368 | 0 | 0 | 32 | 0,438 | 0 | 0 |
| mmc.exe | 1 | 0,015 | 0 | 0 | 1 | 0,014 | 0 | 0 |
| TrustedInstaller.exe | 1 | 0,015 | 0 | 0 | 1 | 0,014 | 0 | 0 |
| chrome.exe | 3 | 0,044 | 0 | 0 | 5 | 0,068 | 0 | 0 |
| teams.exe | 6 | 0,088 | 0 | 0 | 6 | 0,082 | 0 | 0 |
| TabTip.exe | 1 | 0,015 | 0 | 0 | 0 | 0,000 | 0 | 0 |
| Anydesk.exe | 3 | 0,044 | 0 | 0 | 0 | 0,000 | 0 | 0 |
| fortitray.exe | 1 | 0,015 | 0 | 0 | 0 | 0,000 | 0 | 0 |
| Excel.exe | 6 | 0,088 | 0 | 0 | 0 | 0,000 | 0 | 0 |
| fortiesnac.exe | 1 | 0,015 | 0 | 0 | 0 | 0,000 | 0 | 0 |
| ciscowebex.exe | 1 | 0,015 | 0 | 0 | 1 | 0,014 | 0 | 0 |
| | 68 | | | | 73 | | | |

FIG. 7

Demonstration

| Cluster | Cluster-1 | | | | | | | | | | | |
|---|---|---|---|---|---|---|---|---|---|---|---|---|
| Process | Endpoint-1 | | | | Endpoint-2 | | | | Endpoint-3 | | | |
| | n | tf | idf | tf-idf | n | tf | idf | tf-idf | n | tf | idf | tf-idf |
| SearchUI.exe | 1 | 0,016 | 0,000 | 0 | 1 | 0,011 | 0,000 | 0 | 1 | 0,014 | 0 | 0 |
| svchost.exe | 21 | 0,339 | 0,000 | 0 | 32 | 0,360 | 0,000 | 0 | 14 | 0,194 | 0 | 0 |
| conhost.exe | 16 | 0,258 | 0,000 | 0 | 20 | 0,225 | 0,000 | 0 | 28 | 0,389 | 0 | 0 |
| mmc.exe | 1 | 0,016 | 0,000 | 0 | 3 | 0,034 | 0,000 | 0 | 1 | 0,014 | 0 | 0 |
| TrustedInstaller.exe | 3 | 0,048 | 0,000 | 0 | 5 | 0,056 | 0,000 | 0 | 2 | 0,028 | 0 | 0 |
| chrome.exe | 5 | 0,081 | 0,000 | 0 | 15 | 0,169 | 0,000 | 0 | 12 | 0,167 | 0 | 0 |
| teams.exe | 6 | 0,097 | 0,000 | 0 | 5 | 0,056 | 0,000 | 0 | 6 | 0,083 | 0 | 0 |
| vcpkrg.exe | 1 | 0,016 | 0,000 | 0 | 3 | 0,034 | 0,000 | 0 | 1 | 0,014 | 0 | 0 |
| perfwatson2.exe | 1 | 0,016 | 0,000 | 0 | 1 | 0,011 | 0,000 | 0 | 1 | 0,014 | 0 | 0 |
| dockerd.exe | 3 | 0,048 | 0,000 | 0 | 1 | 0,011 | 0,000 | 0 | 3 | 0,042 | 0 | 0 |
| sqlciep.exe | 2 | 0,032 | 0,000 | 0 | 2 | 0,022 | 0,000 | 0 | 2 | 0,028 | 0 | 0 |
| tsvnchache.exe | 1 | 0,016 | 0,000 | 0 | 1 | 0,011 | 0,000 | 0 | 1 | 0,014 | 0 | 0 |
| Malware.exe | 1 | 0,016 | 0,477 | 0,007606 | 0 | 0,000 | 0,477 | 0 | 0 | 0,000 | 0,477 | 0 |
| | 62 | | | | 89 | | | | 72 | | | |

| | Cluster-2 | | | | | | | |
|---|---|---|---|---|---|---|---|---|
| Process | Endpoint-4 | | | | Endpoint-5 | | | |
| | n | tf | idf | tf-idf | n | tf | idf | tf-idf |
| SearchUI.exe | 1 | 0,015 | 0 | 0 | 1 | 0,014 | 0 | 0 |
| svchost.exe | 18 | 0,265 | 0 | 0 | 26 | 0,356 | 0 | 0 |
| conhost.exe | 25 | 0,368 | 0 | 0 | 32 | 0,438 | 0 | 0 |
| mmc.exe | 1 | 0,015 | 0 | 0 | 1 | 0,014 | 0 | 0 |
| TrustedInstaller.exe | 1 | 0,015 | 0 | 0 | 1 | 0,014 | 0 | 0 |
| chrome.exe | 3 | 0,044 | 0 | 0 | 5 | 0,068 | 0 | 0 |
| teams.exe | 6 | 0,088 | 0 | 0 | 6 | 0,082 | 0 | 0 |
| TabTip.exe | 1 | 0,015 | 0 | 0 | 0 | 0,000 | 0 | 0 |
| Anydesk.exe | 3 | 0,044 | 0 | 0 | 0 | 0,000 | 0 | 0 |
| fortitray.exe | 1 | 0,015 | 0 | 0 | 0 | 0,000 | 0 | 0 |
| Excel.exe | 6 | 0,088 | 0 | 0 | 0 | 0,000 | 0 | 0 |
| fortiesnac.exe | 1 | 0,015 | 0 | 0 | 0 | 0,000 | 0 | 0 |
| ciscowebex.exe | 1 | 0,015 | 0 | 0 | 1 | 0,014 | 0 | 0 |
| | 68 | | | | 73 | | | |

| Malware.exe | |
|---|---|
| n | 1 |
| ITF | 2,561101 |
| IDF | 0,69897 |
| ITF-IDF value | 1,79013 |

FIG. 8

| Cluster | Cluster-1 | | | | | | | | | | | |
|---|---|---|---|---|---|---|---|---|---|---|---|---|
| Process | Endpoint-1 | | | | Endpoint-2 | | | | Endpoint-3 | | | |
| | n | tf | idf | tf-idf | n | tf | idf | tf-idf | n | tf | idf | tf-idf |
| SearchUI.exe | 1 | 0,016 | 0,000 | 0 | 1 | 0,011 | 0,000 | 0 | 1 | 0,014 | 0 | 0 |
| svchost.exe | 21 | 0,339 | 0,000 | 0 | 32 | 0,360 | 0,000 | 0 | 14 | 0,194 | 0 | 0 |
| conhost.exe | 16 | 0,258 | 0,000 | 0 | 20 | 0,225 | 0,000 | 0 | 28 | 0,389 | 0 | 0 |
| mmc.exe | 1 | 0,016 | 0,000 | 0 | 3 | 0,034 | 0,000 | 0 | 1 | 0,014 | 0 | 0 |
| TrustedInstaller.exe | 3 | 0,048 | 0,000 | 0 | 5 | 0,056 | 0,000 | 0 | 2 | 0,028 | 0 | 0 |
| chrome.exe | 5 | 0,081 | 0,000 | 0 | 15 | 0,169 | 0,000 | 0 | 12 | 0,167 | 0 | 0 |
| teams.exe | 6 | 0,097 | 0,000 | 0 | 5 | 0,056 | 0,000 | 0 | 6 | 0,083 | 0 | 0 |
| vcpkrg.exe | 1 | 0,016 | 0,000 | 0 | 3 | 0,034 | 0,000 | 0 | 1 | 0,014 | 0 | 0 |
| perfwatson2.exe | 1 | 0,016 | 0,000 | 0 | 1 | 0,011 | 0,000 | 0 | 1 | 0,014 | 0 | 0 |
| dockerd.exe | 3 | 0,048 | 0,000 | 0 | 1 | 0,011 | 0,000 | 0 | 3 | 0,042 | 0 | 0 |
| sqlciep.exe | 2 | 0,032 | 0,000 | 0 | 2 | 0,022 | 0,000 | 0 | 2 | 0,028 | 0 | 0 |
| tsvnchache.exe | 1 | 0,016 | 0,000 | 0 | 1 | 0,011 | 0,000 | 0 | 1 | 0,014 | 0 | 0 |
| Excel.exe | 1 | 0,016 | 0,477 | 0,007696 | 0 | 0,000 | 0,477 | 0 | 0 | 0,000 | 0,477121 | 0 |
| | 62 | | | | 89 | | | | 72 | | | |

| Cluster | Cluster-2 | | | | | | | | |
|---|---|---|---|---|---|---|---|---|---|
| Process | Endpoint-4 | | | | Endpoint-5 | | | | |
| | n | tf | idf | tf-idf | n | tf | idf | tf-idf | |
| SearchUI.exe | 1 | 0,015 | 0 | 0 | 1 | 0,012 | 0 | 0 | |
| svchost.exe | 18 | 0,265 | 0 | 0 | 26 | 0,317 | 0 | 0 | |
| conhost.exe | 25 | 0,368 | 0 | 0 | 32 | 0,390 | 0 | 0 | |
| mmc.exe | 1 | 0,015 | 0 | 0 | 1 | 0,012 | 0 | 0 | |
| TrustedInstaller.exe | 1 | 0,015 | 0 | 0 | 1 | 0,012 | 0 | 0 | |
| chrome.exe | 3 | 0,044 | 0 | 0 | 5 | 0,061 | 0 | 0 | |
| teams.exe | 6 | 0,088 | 0 | 0 | 6 | 0,073 | 0 | 0 | |
| TabTip.exe | 1 | 0,015 | 0 | 0 | 1 | 0,012 | 0 | 0 | |
| Anydesk.exe | 3 | 0,044 | 0 | 0 | 3 | 0,037 | 0 | 0 | |
| fortitray.exe | 1 | 0,015 | 0 | 0 | 1 | 0,012 | 0 | 0 | |
| Excel.exe | 6 | 0,088 | 0 | 0 | 3 | 0,037 | 0 | 0 | |
| fortiesnac.exe | 1 | 0,015 | 0 | 0 | 1 | 0,012 | 0 | 0 | |
| ciscowebex.exe | 1 | 0,015 | 0 | 0 | 1 | 0,012 | 0 | 0 | |
| | 68 | | | | 82 | | | | |

| Excel.exe | |
|---|---|
| n | 10 |
| TF | 1,571709 |
| IDF | 0,221849 |
| | 0,348658 |

FIG. 9

METHOD AND SYSTEM FOR DETECTING OUTLIERS IN PROCESSES

This application claims priority to European Patent Application Number 21200770.2, filed 4 Oct. 2021, the specification of which is hereby incorporated herein by reference.

BACKGROUND OF THE INVENTION

Field of the Invention

Embodiments of the invention relate to a method and a system for detecting outliers in processes running in a group of machines.

Description of the Related Art

Compromise assessment is an active analytical search with a focus on indicators of a successful compromise. It is commonly done as a part of vulnerability assessment exercise to check if there is an active threat which has exploited those open vulnerabilities and gained foothold inside. It also done as a part of breach response when traditional defenses have failed and a malicious program has gained entry into the system. It can be done either post vulnerability discovery or post incident analysis.

This exercise is done mostly using statistical approach of data mining to discover active threats. For the period of the assessment, the analysts dig deeper and with wider authority than what is done on a day-to-day in real-time monitoring. The approach is to first build a repository of various forensic artifacts and then apply data mining techniques to drill down to point of interest.

Attackers often plant malwares in organization with an intent to exfiltrate (spyware), hijack (ransomware) or damage (Wiper) data. The reason for using malware as a tool for carrying out these activities is the advantage of prolonged foothold into target system. These malwares reside on a system as a process which can be hidden or appear as legitimate process. They maintain stealth or presence for as long as possible to exert damage to the maximum.

Traditional security systems operate to detect malwares using signature, patterns and/or heuristics. These signatures contain indicators which describes the malware or pattern. These signatures are provided by security software vendor who generates them based on their research. This limitation of this approach is that patterns or signatures can be generated for a malware which is encountered in past. Modern day threats have mostly been able to bypass traditional defense like antivirus and IDS (Intrusion Detection System) as they develop targeted threats which is used only against designated organization and hence security vendors do not become privy to the information needed to develop signatures.

Due to this limitation, analytical search is conducted to discover these modern-day targeted threats. Generally, this exercise starts with development of forensic database which contains information about process running, network connections, installed software in each system. Next the analysts run supervised or unsupervised learning on this forensic database for enough period for algorithm to train properly. This time is generally 20 to 30 days depending on system variance. After the training, the algorithm starts detecting outliers which are further investigated by analysts. This keeps on going till no more outliers are found and the assessment activity concludes. This approach works when compromise assessment is triggered as a part of periodic proactive activity.

The above-described approach does not work if it is a reactive activity i.e., if it is triggered as a part of breach response or vulnerability discovery. This scenario mostly revolves around an attacker attacking a few systems to gain foothold or there is new awareness of vulnerability which attacker might have exploited to gain foothold. The incident handler must pitch in to analyze data, but he would not have enough time (20 or 30 days) or even older data to get started.

All supervised or unsupervised algorithm require sufficient data to train, but Compromise assessments pose a unique challenge that there is not enough time gather data and train the algorithms. There are three broad set of problems discussed so far.

1. Compromise assessments are triggered post incident or post vulnerability discovery. It is a state when immediate analysis is required and hence there is very little learning time.
2. Commonly known methods of simple frequency distribution of process and detecting least used process will fail. As this approach is complicated by large variance in usage of software and thus processes, found in systems. There will be large number of false positives due to diverse processes running in specialized team endpoints which is churn out lot of false positives, for example
   1. Developer teams might run IDEs (integrated development environment) like visual Studio® or Eclipse®, which will be running only in a few systems.
   2. Finance teams might run tally which will be running in a few systems.
   3. Commonly known methods of clustering do not work effectively in this scenario as there is not enough data to calculate similarity between two endpoints effectively. New processes keep showing up as timeline proceeds, leading to incorrect clustering.

An object of one or more embodiments of the invention is to provide a method which able to find outliers with a minimum of false positives.

Another object of one or more embodiments of the invention is to provide a method which is able to find outliers in less than 20 to 30 days.

BRIEF SUMMARY OF THE INVENTION

These and other objects of one or more embodiments of the invention are substantially achieved by providing a method for detecting outliers in processes running in a group of machines; the method being carried out by a computer and comprising:

a clustering stage carried out at a first frequency and comprising the following steps:
  fetching a list of software contained in all machines.
  calculating tf-idf (term frequency-inverse document frequency) value for each installed software and for each machine.
  performing clustering of the machines by applying a clustering algorithm and using Jaccardian weighted distance method between machines based on the tf-idf values.
a preliminary outliers detection stage carried out at a second frequency, the second frequency being greater than the first frequency, and said preliminary outliers detection stage comprising the following steps:

fetching information of processes running in the machines.

for each cluster, calculating tf-idf values for each process, if a tf-idf value is greater than a first predetermined threshold, the current process is considered as outlier.

for all clusters, calculating itf-idf value for each process considered as outlier, if a itf-idf value is lower than a second predetermined threshold, the current process is confirmed as outlier.

The method according to one or more embodiments of the invention starts by grouping machines or endpoints based on initial low volatile data because we need initial set of clusters to start the algorithm. The "installed software list" comprises information that is not very dynamic.

At least one embodiment of the invention is for example remarkable by applying tf-idf method on software and process of machines. Indeed, th-idf is a method which is rather applied on documents. The tf-idf (term frequency-inverse document frequency) method is a numerical statistic that is intended to reflect how important a word is to a document in a collection or corpus. In one or more embodiments of the invention, tf-idf is a value, a number, that represents a weight of a software/process in a machine.

For a machine, the values of tf-idf of all software can be represented as a vector.

In at least one embodiment, the process information can comprise the following data:

Id, ProcessId, Name, Command HandleCount, DynamicLibLoaded, Version, ParentProcessId, Path, HashCode, Signed, Signature, MappedDlls, UpdatedAt, CreatedOn, LastAccessedOn, LastWriteOn.

According to at least one embodiment of the invention, the clustering algorithm can be a DBSCAN (density-based spatial clustering of applications with noise) algorithm, an OPTICS algorithm or K-Means algorithm.

Technically TF-IDF is a vector of numbers. Preferably, in one or more embodiments. DBScan is used because it makes it possible to segregate out endpoints which can be noisy and difficult to be clusterized.

The DBSCAN algorithm used in at least one embodiment of the invention is for example the DBScan as described by Ester. Martin; Kriegel, Hans-Peter; Sander, Jörg; Xu, Xiaowei (1996). Simoudis, Evangelos; Han, Jiawei; Fayyad, Usama M. (eds.). A density-based algorithm for discovering clusters in large spatial databases with noise. Proceedings of the Second International Conference on Knowledge Discovery and Data Mining (KDD-96).

One or more embodiments of the invention makes it possible to find outliers in a short learning time by modifying the frequency distribution approach of prior art to find the outliers in an adaptive way. The method according to at least one embodiment of the invention concerns the collection of a first set of data, for example data of software, and a collection of a second set of data, process data. The two sets of data are collected at different frequencies.

The first stage is iteratively carried out at the first frequency to form clusters.

The second stage is iteratively carried out at the second frequency to detect outliers.

With the use of adaptive clustering, the method of one or more embodiments of the invention is capable of reducing false positives.

To reduce the false positives due to large software variance, at least one embodiment of the invention uses a new approach of endpoint clustering and then outlier detection. Thus, in one or more embodiments, by creating a group of, for example, every developer systems or finance systems, then specific applications like visual studio or tally cannot become false positives as they are common in the group.

According to at least one embodiment of the invention, for an installed software/process t and a machine d in a cluster c, the tf-idf can be function of:

a ratio between a number of times the installed software/process t appears in the machine d, and a total number of apparition of all installed software/processes in the machine d, a ratio between a total number of machines in the cluster c, and a total number of machines in the cluster c wherein the installed software/process t appears.

For example, the tf-idf can be defined as follows:

$$\text{tf-idf} = \text{tf}(t) * \text{idf}(t) \text{ with:}$$

t being an installed software or a process.

$$\text{tf}(t) = f(t)/\Sigma_t f(t)$$

f(t) being a frequency of software/process t in a machine d, and:

$$idf(t) = \log\left(\frac{1+n}{1+\sum_t bf(t)}\right) + 1,$$

with:
n being the total number of machines d.
bf(t)=Boolean frequency of installed software t in a machine d; it is 1 if installed software is present in machine d, 0 otherwise.

According to at least one embodiment of the invention, for a process t, the itf-idf being function of:

a ratio between a total number of apparition of all processes in all machines of all clusters, and a total number of apparition of process t in all machines of all clusters, and a ratio between a total number of all machines, and a total number of machines wherein the process t appears.

For example, the itf-idf can be defined as follows:

$$\text{Itf-idf} = \text{if}(t) * \text{df}(t), \text{ with}$$

$$\text{if}(t) = \log\left(\frac{1 + \sum_{t,d} f(t, d)}{1 + \sum_d f(td)}\right) + 1,$$

with:
t being an installed software or a process,
d being a machine.
$\Sigma_{t,d} f(t,d)$ being a summation of frequencies of all processes t found in all machines d,
$\Sigma_d f(t \cdot d)$ being summation of frequency of process t in all machines.

$$idf(t) = \log\left(\frac{1+n}{1+\sum_t bf(t)}\right) + 1,$$

with:
n being the total number of machines d,
bf(t)=Boolean frequency of installed software t in a machine d; it is 1 if installed software is present in machine d, 0 otherwise.

An apparition of a process or an installed software means the running of this process or this installed software.

The tf-idf used in one or more embodiments of the invention is for example the tf-idf as described Rajaraman, A.; Ullman. J. D. (2011). *"Data Mining"* (PDF). Mining of Massive Datasets.

In other words, at least one embodiment of the invention applies the tf-idf techniques, generally used for documents, on software, process and machines:
't' is generally a term; in one or more embodiments of the invention "t" is an installed software or process;
'd' is generally a document: in one or more embodiments of the invention "d" is a machine where agent is installed.
f(t) is the frequency of term t in document d,
tf(t) is the term frequency of term t,
idf(t) is the inverse document frequency of term t,
$\Sigma_{t,d} f(t,d)$ means summation of frequencies of all term 't' found in all documents d, in one or more embodiments of the invention it is all processes in all machines.
$\Sigma_d f(t \cdot d)$ means summation of frequency of term 't' in all documents (machines) d.

According to at least one embodiment of the invention, the steps of fetching can be carried out by a local agent installed in each machine. This local agent is preferably a lightweight agent which is deployed in each machine of the system.

According to one or more embodiments of the invention, the installed software list can comprise a low volatile information of installed software, services or scheduled task.

Advantageously, in at least one embodiment, the second frequency is for example a real time frequency. The process information is considered as high volatile information and is regularly collected at a frequency which is the second frequency.

The method according to one or more embodiments of the invention does not requires 30 days of training data and can start by analyzing day one forensic snapshot.

The jaccard distance used in one or more embodiments of the invention is for example the Jaccard Distance as described in https://nph.onlinelibrary.wiley.com/doi/abs/10.1111/j.1469-8137.1912.tb05611.x. "New Phytologist", vol. XI. No 2. February 1912.

According to at least one embodiment of the invention, the method can further comprise, when a current process considered as outlier is not confirmed as outlier, a feedback loop comprising following steps:
calculating a fitment for each cluster,
moving the machine to another cluster having better fit than the current cluster.

For example, calculating a fitment for each cluster can comprise:
calculating a term frequency weight for each process in the cluster, the term frequency weight being the number of machines where the process is observed divided by total number of machines in the cluster.
for each machine in the cluster, calculating a match score which is a sum of term frequency weights of all processes running in the machine.
calculating a cluster match score which is an average of match scores of machines of the cluster.
for each machine, testing inclusion of this machine in another cluster by calculating a feature match score which is a sum of term frequency weights of all processes running in the machine and also running in the said another cluster.
if the feature match score is above or equal to a cluster match score of said another cluster, the machine is moved to the said another cluster only if the difference between the match score of the machine in the current cluster and the cluster match score of the current cluster is greater than the distance between the feature match score calculated and match score of said another cluster.

As a matter of fact, the machines change over time, new applications are installed or used and behavior changes. With every batch of process information available, the method of one or more embodiments of the invention calculates the possibility of machine being in another cluster. Choosing the right cluster for machine reduces the false positives.

Advantageously, in at least one embodiment, the weighted Jaccardian Distance is defined as follows:
If $x=(x1, x2, \ldots xn)$ and $y=(y1, y2, \ldots yn)$ are two vectors with all real xi, yi≥0 then their weighted Jaccard distance is defined as $$J_w(x, y) = 1 - \frac{\sum_i \min(x_i, y_i)}{\sum_i \max(x_i, y_i)}$$

As the information collected comprises unordered set of strings, in one or more embodiments, the weighted jaccardian distance is used for calculating distance or magnitude of dissimilarity.

According to at least one embodiment of the invention, it is proposed a system for detecting outliers, comprising:
a group of machines,
a local agent installed in each machine,
an event collector for receiving data from all local agents,
a forensic repository for receiving data from the event collector,
an analysis engine for running the method according to any of preceding claims based on data contained in the forensic repository, and
an agent controller for sending instructions to the local agents to collect data in response to an order from the analysis engine.

According to at least one embodiment of the invention, it is proposed a computer program comprising instructions which, when the program is executed by a processing unit, cause the processing unit to carry out the steps of the method as described above.

One or more embodiments of the invention also concerns a non-transitory computer-readable storage medium encoded with computer-executable instructions which, when executed, perform the method as described above.

BRIEF DESCRIPTION OF THE DRAWINGS

Further advantages and characteristics of the invention will become apparent on examining the detailed description of one or more embodiments, which is in no way limitative, and the attached drawings, in which.

FIG. 6 is a table showing TF-IDF calculation without clustering according to one or more embodiments of the invention.

FIG. 7 is a table showing TF-IDF Vectors post clustering, neutralizing all noise, according to one or more embodiments of the invention.

FIG. 8 is a table showing outlier detection and confirmation by calculating itf-idf value, according to one or more embodiments of the invention, FIG. 9 is a table showing false positive outlier detection and confirmation by calculating itf-idf value, according to one or more embodiments of the invention.

DETAILED DESCRIPTION OF THE INVENTION

Figure 1:
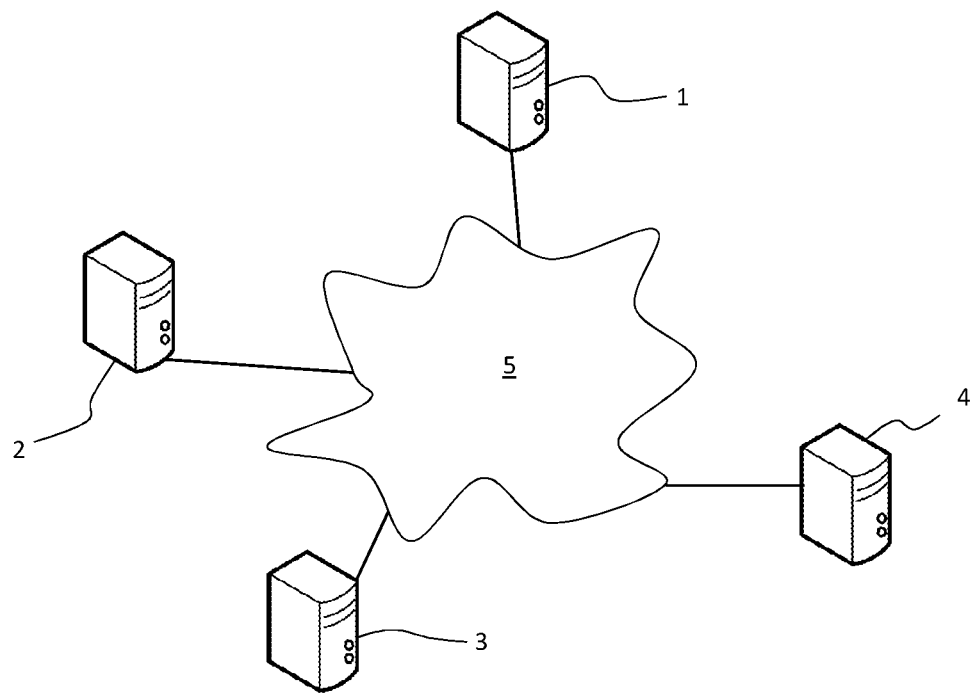
FIG. 1 is a general view of a schematic system according to one or more embodiments of the invention.

While the invention is susceptible to various modifications and alternative forms, one or more embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of one or more embodiments of the invention as defined by the appended claims.

Hereinafter, at least one embodiment of the invention will be described in detail by explaining exemplary embodiments of the invention with reference to the attached drawings.

In accordance with at least one embodiment of the embodiment, the method and system according to one or more embodiments of the invention relate to the following materials and processes:

One or more embodiments herein include computer-implemented methods, tangible non-transitory computer-readable mediums, and systems. The computer-implemented methods may be executed, for example, by a processor that receives instructions from a non-transitory computer-readable storage medium. Similarly, by way of at least one embodiment, a system described herein may include at least one processor and memory, and the memory may be a non-transitory computer-readable storage medium. As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs. DVDs, flash drives, disks, and any other known physical storage medium. Singular terms, such as "memory" and "computer-readable storage medium." may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

FIG. 1 depicts a network comprising a server 1 which is able to communicate with a group of machines, for example homogenous machines, or endpoints 2-4 via a communication network such as Internet 5, according to at least one embodiment of the invention. For the rest of the description, the terms machine and endpoint will be used interchangeably.

Preferably, in one or more embodiments, each machine 2-4 contain a local agent which is configured to communicate with the server 1.

The server 1 comprises hardware and software components such as for example a central processing unit (CPU), memory coupled to the CPU; and a computer readable storage medium coupled to the CPU: the storage medium containing instructions that are executed by the CPU via the memory to implement the method according to one or more embodiments of the invention.

At least one embodiment of the invention aims to use advanced security analytics on machines, software, processes, and network; to provides deeper detection compared to prior art systems.

Figure 2:
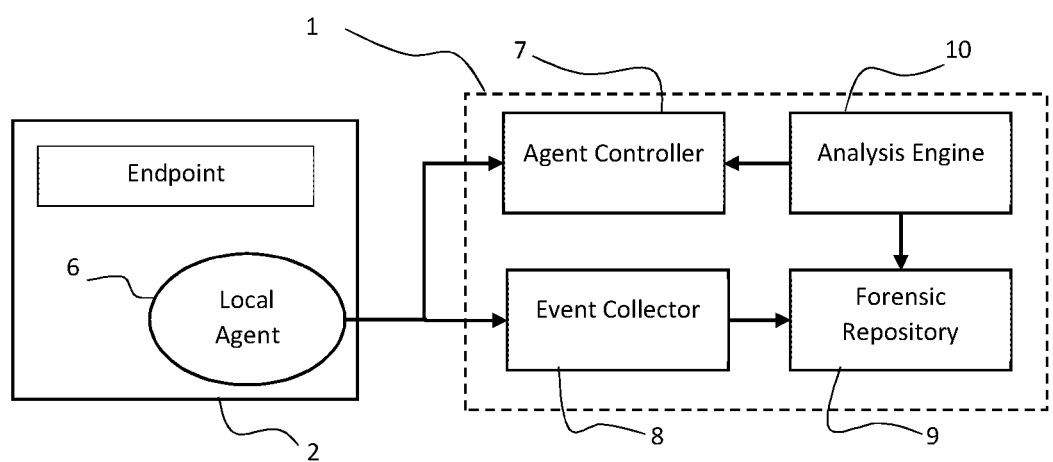
FIG. 2 is a general view of components of the system according to one or more embodiments of the invention.

FIG. 2 depicts an overview of components of the system according to one or more embodiments of the invention. Only the machine 2 is illustrated with a local agent integrated. The other components 7-10 can for example be installed in the server 1. For one having ordinary skill in the art, it is also conceivable to split the components 7-10 within different computer.

The local agents are lightweight agents which are deployed in each machine. The local agent 6 is configured to receive instructions of data collection from an agent controller 7. Each agent is able to collect information of two natures:

1. low volatile forensic information like installed software, services, scheduled task etc. These are collected at a first frequency which is considered as a lower frequency, for example once a month or in several months.
2. highly volatile runtime information like process and network information. These are collected in a second frequency which is higher than the first frequency, for example near real time.

Items like installed software, scheduled tasks and services don't change very fast. They are mostly static. Whereas process and network connections change very fast. Every minute there can be a new process or network connections.

The local agent 6 is configured to transmit the collected information to a collection server called Event Collector 8, according to one or more embodiments. The event collector 8 pushes these transmitted data to a forensic repository 9 on which analysis engine 10 operates to run the method according to at least one embodiment of the invention.

There are stages of analysis algorithm of the one or more embodiments of the invention which requires different nature of data. Depending upon the stage, the analysis engine 10 instructs the agent controller 7 to collect data of required nature.

In addition to the above, the method according to at least one embodiment of the invention will now be described as an algorithm overview of FIG. 3.

In general, the method according to one or more embodiments of the invention comprises a first stage of grouping machines based on initial low volatile data of software which are installed in the system.

The second stage concerns a collection of high volatile data to detect outliers. To reduce the false positives due to large software variance, an approach of machines clustering is applied and then the outlier detection is applied. The objective here is that if we can group, for example, every developer systems or finance systems, then specific applications like visual studio or tally will not become false positives as they will be common in the group.

As the collected information comprises unordered set of strings, weighted jaccardian distance is defined for calculating distance or magnitude of dissimilarity.

Figure 3:
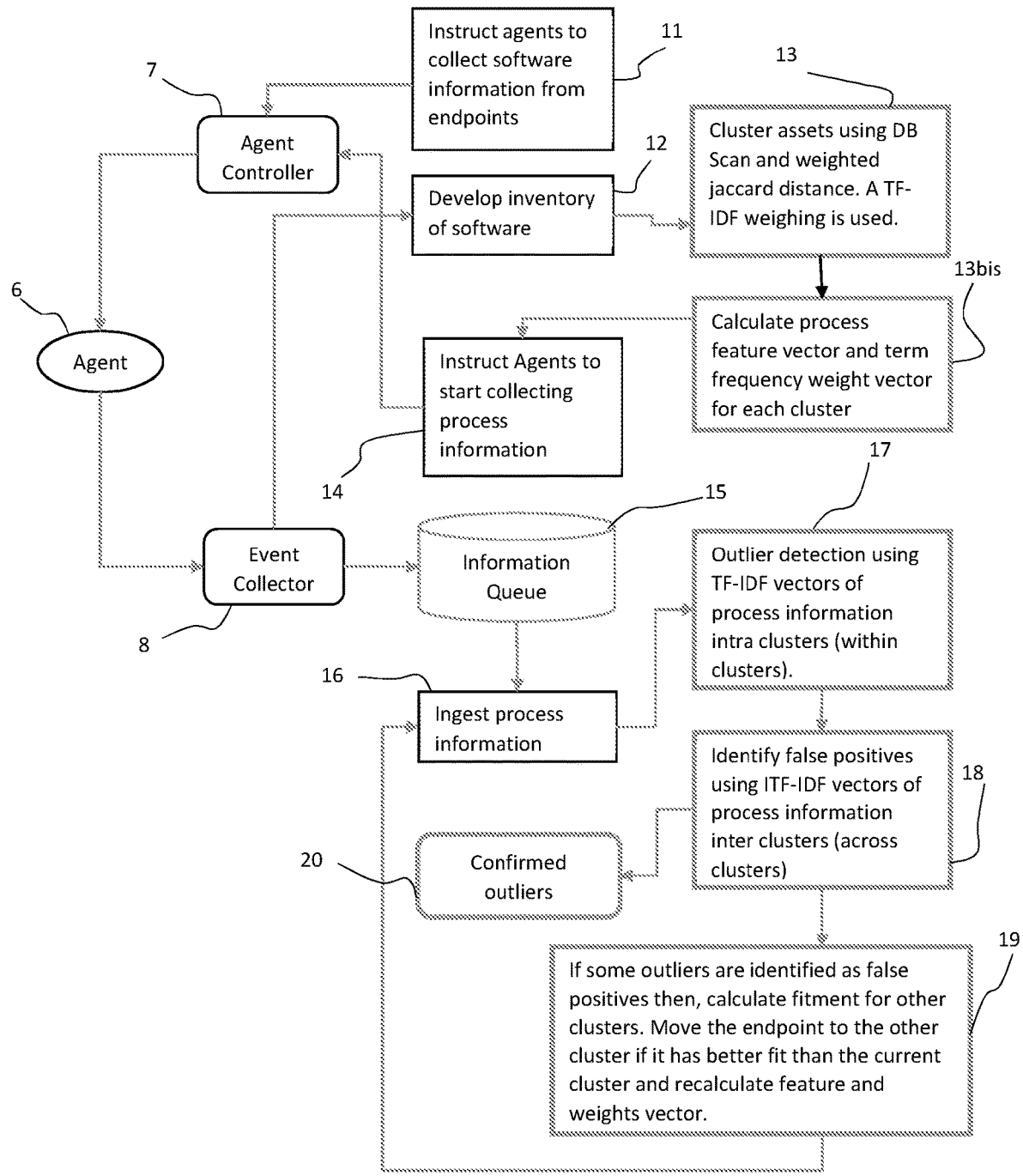
FIG. 3 is an algorithm overview according to one or more embodiments of the invention.

FIG. 3 shows different steps carried out by the analysis engine in communication with the agent controller 7, the event collector 8 and the local agent 6, according to one or more embodiments of the invention.

The first stage will now be described.

The analysis engine instructs at step 11 the agent controller 7 to fetch software information from endpoints/machines. Only local agent 6 of the machine 2 is shown.

The agent controller 7 passes on this instruction to each agent running on machines. The local agent 6 sends the collected information back to event collector 8.

Next, an inventory of software is developed at step 12. At step 13. TF-IDF vectors are calculated for each machine. Each TF-IDF value corresponds to an installed software. Then a DBSCAN algorithm is used to perform clustering. The distance function used in applying the DBSCAN is weighted Jaccardian distance between the calculated TF-IDF vectors. Clusters are thus formed.

At step 13*bis*, process feature vector can be calculated and term frequency weight vector for each cluster can also be calculated.

The FIG. 6 shows TF-IDF calculation without clustering, according to one or more embodiments. FIG. 6 is a table where tf-idf values are calculated for several processes listed on the first column. Endpoint represents a machine. For each machine, the table of FIG. 6 shows the calculation of f(t), tf, idf and tf-idf.

On FIG. 7, the machines (endpoints) have been gathered in two clusters, cluster-1 and cluster-2, according to one or more embodiments of the invention. The calculation of f(t), tf, idf and tf-idf has been carried out. Each column of values inside a machine can be considered as a vector. The table on FIG. 7 shows that noises have been neutralized. The columns of tf-idf for each machine is at zero whereas there were some values on FIG. 6.

Thanks to the comparison between FIG. 6 and FIG. 7, the advantage of the step of clustering is shown, according to one or more embodiments of the invention.

Once the initial set of clusters is formed, the analysis engine instructs the agent controller 7 to start collecting process information at step 14.

The second stage will now be described, by way of at least one embodiment.

Next, at step 15, the information is gathered one after the other. At step 16, the process information is collected and ingested. At step 17, outlier detection is carried out using TF-IDF vectors of process information intra clusters (within clusters). In other words. TF-IDF is calculated for each machine in each cluster based on process information available. Then, the analyst engine defines a first threshold or cut-off value for deciding on outliers. Each outlier identified at step 17 will be confirmed or not at step 18.

The calculation of tf-idf during the step 17 is explained as follows in combination with FIG. 8.

FIG. 8 shows two clusters: cluster-1 and cluster-2, according to one or more embodiments of the invention. The first column of each cluster contains a list of processes.

The first cluster contains three machines: endpoint-1, endpoint-2 and endpoint-3.

For each endpoint, f(t), tf, idf and tf-idf are calculated.

The f(t) concerns the frequency of the process (or installed software during the step of clustering) in the machine (endpoint) considered. It is the number of apparition (run) of the process considered. For example, for the process "svchost.exe", f(t)=21 for Endpoint-1. It means that the process "svchost" has been run 21 times for the considered period. The period is related to the frequency of carrying out the second stage of outliers detection.

The tf value is the division between f(t) and the summation of all f(t), i.e. 21/62=0.339.

The idf value (when calculating tf-idf) is the ratio between the total number of endpoints in this cluster and the total number of endpoints in the cluster wherein the process appears. For example, for "svchost" the ratio is 3/3. In at least one embodiment of the invention, idf is considered as a logarithm of this ratio: log(3/3)=0. Others function can easily be considered by the person skilled in the art. It is for example possible to consider others nonlinear functions.

Tf-idf is the multiplication between tf and idf.

For the detection of outliers, a first threshold can be determined for example at 0.005.

FIG. 8 shows that a malware has been detected as the tf-idf of "Malware.exe" is 0.007696, greater than the predetermined first threshold. It is then possible to confirm this outlier detection by considering the other clusters.

The step 18 concerns identification of false positives using ITF-IDF vectors of process information inter clusters (across clusters). In other words, in at least one embodiment, the step 18 concerns the calculating of itf-idf values for each process considered as outlier by considering all clusters, if a itf-idf value is lower than a second predetermined threshold, the current process is confirmed as outlier.

On FIG. 8 concerns the "Malware.exe" is detected as outlier on cluster-1 and not on cluster-2.

Itf is function of a ratio between the total number of apparition of all processes in all machines of all clusters, and a total number of apparition of process "Malware.exe" in all machines of all clusters. i.e. (62+89+72+68+73)/(1)=364. In at least one embodiment of the invention, itf is considered as a logarithm of this ratio: log(364)=2.561101. Others function can easily be considered by the person skilled in the art. It is for example possible to consider others nonlinear functions.

Idf (when calculating itf-idf) is function of a ratio between the total number of all machines, and a total number of machines wherein the process "Malware.exe" appears. i.e. (5/1). In one or more embodiments of the invention, idf is considered as a logarithm of this ratio: log(5)=0.69897. Others function can easily be considered by the person skilled in the art. It is for example possible to consider others nonlinear functions.

Itf-idf value is the multiplication between itf and idf=2.561101*0.69897=1.79013. With a second threshold determined for example at 1, the outlier detected is then confirmed.

FIG. 9 shows the same calculation where an outlier "Excel.exe" is detected as the tf-idf value 0.007696 is greater than the first threshold. But the calculation of itf-idf gives a value smaller than the second threshold.

In this example, the "Excel.exe" is not a true outlier. It is a process which also runs on the two clusters.

According to at least one embodiment of the invention, as machines or endpoints change over time, new applications are installed or used and behavior of machine changes. With every batch of process information available, the possibility of machine being in another cluster is calculated. According to at least one embodiment of the invention, choosing the right cluster for machine reduces the false positives.

This is done by analyzing at step 19 if some outliers are identified as false positives then, calculate fitment for other clusters. Move the endpoint to the other cluster if it has better fit than the current cluster and recalculate feature and weights vector.

Thus at step 19, for each asset where false positives are identified, best fit cluster is calculated and asset is moved to another cluster if found.

The method, in at least one embodiment, for asset cluster adjustment for reducing false positives is as follows.

When an asset churns out false positives then another cluster where it has better fit has to be found out. To estimate cluster fitting, weighted matching is used. The term-frequency of each process is used as weights. Term frequency of each process is number of endpoints where the process is observed divided by total number of endpoints.

Once clustering is done, its process vector is calculated which is a feature vector. Then term frequency vector is determined for the cluster which is term-frequency of each process in the cluster. While comparing, more weightage is given to commonly occurring programs and less weightage to rarely occurring programs.

The term frequency vector for a cluster is also calculated. The processes are sorted by their term frequencies. As shown in the Table 1 below, process-1, process-2, process-3, and process-4 have the highest probability in the cluster, that is, any endpoint in this cluster will mostly have this process running, according to one or more embodiments. In future, while deciding for candidature of any endpoint for this cluster, more emphasis is put on commonly occurring processes.

TABLE 1

| | Cluster A | | | | | |
| --- | --- | --- | --- | --- | --- | --- |
| | End-point-1 | End-point-2 | End-point-3 | End-point-4 | End-point-5 | Weights |
| Process-1 | 1 | 1 | 1 | 1 | 1 | 5/5 = 1.0 |
| Process-2 | 1 | 1 | 1 | 1 | 1 | 5/5 = 1.0 |
| Process-4 | 1 | 1 | 1 | 1 | 1 | 5/5 = 1.0 |
| Process-3 | 1 | 1 | 1 | 1 | 1 | 5/5 = 1.0 |
| Process-10 | 1 | 0 | 1 | 1 | 1 | 4/5 = 0.8 |
| Process-8 | 0 | 1 | 1 | 1 | 1 | 4/5 = 0.8 |
| Process-9 | 1 | 1 | 0 | 1 | 0 | 3/5 = 0.6 |
| Process-6 | 1 | 1 | 1 | 0 | 0 | 3/5 = 0.6 |
| Process-5 | 1 | 1 | 0 | 0 | 0 | 2/5 = 0.4 |
| Process-7 | 0 | 1 | 1 | 0 | 0 | 2/5 = 0.4 |
| Process-11 | 1 | 0 | 1 | 0 | 0 | 2/5 = 0.4 |
| Process-12 | 0 | 0 | 0 | 0 | 1 | 1/5 = 0.2 |

Then the match score is determined for each endpoint in the cluster based on their TF Weights, see Table 2, by way of one or more embodiments.

TABLE 2

| | Cluster-A | | | | | |
| --- | --- | --- | --- | --- | --- | --- |
| | Weights | End-point-1 | End-point-2 | End-point-3 | End-point-4 | End-point-5 |
| Process-1 | 1.0 | 1 | 1 | 1 | 1 | 1 |
| Process-2 | 1.0 | 1 | 1 | 1 | 1 | 1 |
| Process-4 | 1.0 | 1 | 1 | 1 | 1 | 1 |
| Process-3 | 1.0 | 1 | 1 | 1 | 1 | 1 |
| Process-10 | 0.8 | 0.8 | 0 | 0.8 | 0.8 | 0.8 |
| Process-8 | 0.8 | 0 | 0.8 | 0.8 | 0.8 | 0.8 |
| Process-9 | 0.6 | 0.6 | 0.6 | 0 | 0.6 | 0 |
| Process-6 | 0.6 | 0.6 | 0.6 | 0.6 | 0 | 0 |
| Process-5 | 0.4 | 0.4 | 0.4 | 0 | 0 | 0 |
| Process-7 | 0.4 | 0 | 0.4 | 0.4 | 0 | 0 |
| Process-11 | 0.4 | 0.4 | 0 | 0.4 | 0 | 0 |
| Process-12 | 0.2 | 0 | 0 | 0 | 0 | 0.2 |
| Match Score | | 6.8 | 6.8 | 7.0 | 6.2 | 5.8 |

Then, average match score for the cluster is to be determined.

Average Match Score=(6.8+6.8+7.0+6.2+5.8)/5=6.52

When an endpoint for inclusion in the cluster is considered, its feature vector is determined. The match of feature vector of endpoint against the feature vector of cluster is calculated. Next, by way of one or more embodiments, each distance is multiplied by its corresponding term frequency weights, see Table 3. If the match of the endpoint is above or equal to average match score, then the endpoint is considered for inclusion into a cluster, according to at least one embodiment.

TABLE 3

Fitment calculation of inclusion of Endpoint-x and Endpoint-y in Cluster-A

| | Cluster-A Weights | Cluster-A Feature Vector | Endpoint-x Feature Vector | Weighted Match | Endpoint-y Feature Vector | Weighted Match |
|---|---|---|---|---|---|---|
| Process-1 | 1.0 | 1 | 1 | 1 | 0 | 0 |
| Process-2 | 1.0 | 1 | 1 | 1 | 0 | 0 |
| Process-4 | 1.0 | 1 | 1 | 1 | 0 | 0 |
| Process-3 | 1.0 | 1 | 0 | 0 | 1 | 1 |
| Process-10 | 0.8 | 1 | 1 | 0.8 | 0 | 0 |
| Process-8 | 0.8 | 1 | 1 | 0.8 | 0 | 0 |
| Process-9 | 0.6 | 1 | 1 | 0.6 | 1 | 0.6 |
| Process-6 | 0.6 | 1 | 1 | 0.6 | 1 | 0.6 |
| Process-5 | 0.4 | 1 | 1 | 0.4 | 1 | 0.4 |
| Process-7 | 0.4 | 1 | 0 | 0 | 1 | 0.4 |
| Process-11 | 0.4 | 1 | 1 | 0.4 | 1 | 0.4 |
| Process-12 | 0.2 | 1 | 0 | 0 | 1 | 0.2 |
| Process-13 | 0 | 0 | 0 | 0 | 1 | 0 |
| Process-14 | 0 | 0 | 1 | 0 | 1 | 0 |
| Total Matched Weights | | | | 6.6 | | 3.6 |

Then the match score of Endpoint-x for given Cluster-A is 6.6.

Average match score of Cluster-A is 6.52.

Distance between Endpoint-x in candidate Cluster-A 6.6−6.52=0.08

Next, a check is made if the new cluster of the endpoint is better than the current cluster, according to one or more embodiments of the invention. To do this the distance is taken from average match score of clusters. A comparison is done if the distance in the current cluster is higher than the distance in the candidate cluster. If yes, the assets are moved to the new cluster else the assets are kept in the same cluster, according to at least one embodiment.

TABLE 4

| | Endpoint-x Feature Vector | Current Cluster-B Weights | Current Cluster-B Weighted Match | Candidate Cluster-A Weights | Candidate Cluster-A weighted match |
|---|---|---|---|---|---|
| Process-1 | 1 | 0 | 0 | 1.0 | 1.0 |
| Process-2 | 1 | 0 | 0 | 1.0 | 1.0 |
| Process-4 | 1 | 0.2 | 0.2 | 1.0 | 1.0 |
| Process-3 | 0 | 0 | 0 | 1.0 | 0 |
| Process-10 | 1 | 0.6 | 0.6 | 0.8 | 0.8 |
| Process-8 | 1 | 0.6 | 0.6 | 0.8 | 0.8 |
| Process-9 | 1 | 0 | 0 | 0.6 | 0.6 |
| Process-6 | 1 | 0.8 | 0.8 | 0.6 | 0.6 |
| Process-5 | 1 | 0.8 | 0.8 | 0.4 | 0.4 |
| Process-7 | 0 | 0.8 | 0 | 0.4 | 0 |
| Process-11 | 1 | 1.0 | 1.0 | 0.4 | 0.4 |
| Process-12 | 0 | 1.0 | 0 | 0.2 | 0 |
| Process-13 | 0 | 1.0 | 0 | 0 | 0 |
| Process-14 | 1 | 1.0 | 1.0 | 0 | 0 |
| Total Matched Weights | | | 5 | | 6.6 |

For example:

Average Match Score of Cluster-B (Current cluster of target endpoint)=5.6

Endpoint-x feature match score in its current Cluster-B=5

Distance in current cluster (Dcurrent)=5−5.6=−0.6

Distance in candidate cluster (Dcandidate)=6.6−6.52=0.08

In this case we will move the endpoint to candidate cluster as Dcurrent>Dcandidate and Dcandidate>Avg Match Score of candidate cluster.

The algorithm of step 19 can be described as follows:
Let A be the endpoint where outliers were false positives
Let VA be the process feature vector for endpoint A.
Let C be the set of identified clusters.
Let M be a cluster from set C which is not yet checked for better fit for Endpoint A
Let AVGm be the average score for cluster M.
Let Vm be process feature vector for cluster M. Let Wm, be the term frequency weights represented as vector for cluster M
Let O be the cluster from set C where endpoint A is currently placed
Let AVGo be the average score for cluster O.
Match score of Endpoint A with cluster M is calculated as $MatchScore_{A-M} = \Sigma_i Wmi \times (Vmi \char`^ Vai)$ —here $\char`^$ represents Boolean AND operation.

Distance for endpoint A to Cluster M is calculated as.

$D_{A-M} = AVG_M - MatchScore_{A-M}$

In a similar way. $MatchScore_{A-O}$ and $D_{A-O}$ are calculated.
If $MatchScore_{A-M} < AVGm$ and If $D_{A-M} < D_{A-O}$, then Move Endpoint A to Cluster M and recalculate $V_M$ and $W_M$ for cluster M (new cluster). And recalculate $V_O$ and $W_O$ for O (previous cluster).

The step 20 concerns the confirmation of the outlier detected.

Figure 4:
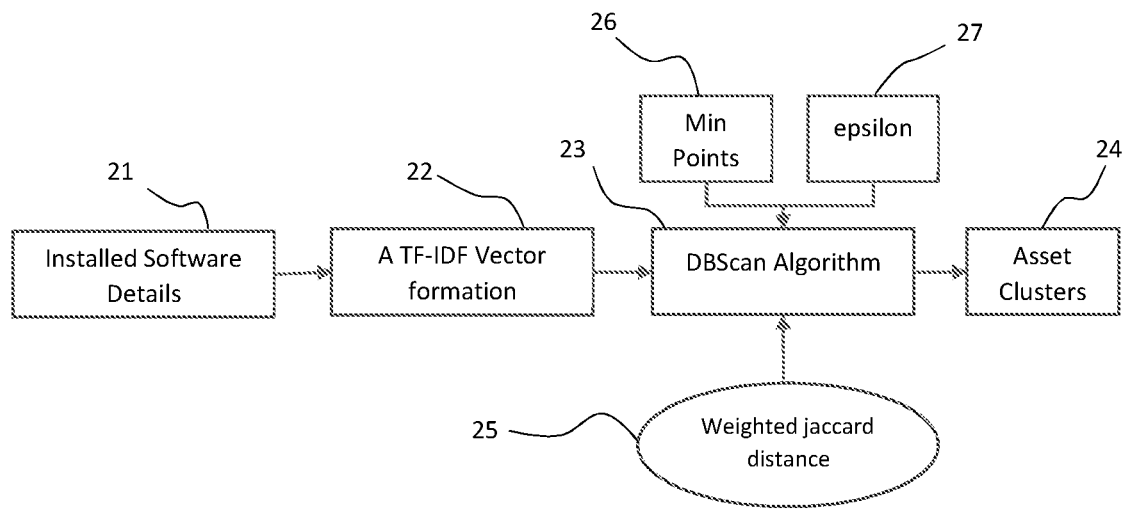
FIG. 4 is a flowchart depicting the clustering stage, according to one or more embodiments of the invention.

The first stage of clustering is described on FIG. 4, according to one or more embodiments of the invention. Installed software details 21 are used to create tf-idf vectors at step 22. The DBScan algorithm is applied on step 23 with parameters Min Points 26 and epsilon 27 entered by the user. A person skilled in the art knows how to use a weighted Jaccard distance 25 during the DBScan algorithm. Clusters are formed at step 24.

Eps (epsilon) and MinPts (minimum points) are parameters determined by the user during applying the Jaccardian method.

Figure 5:
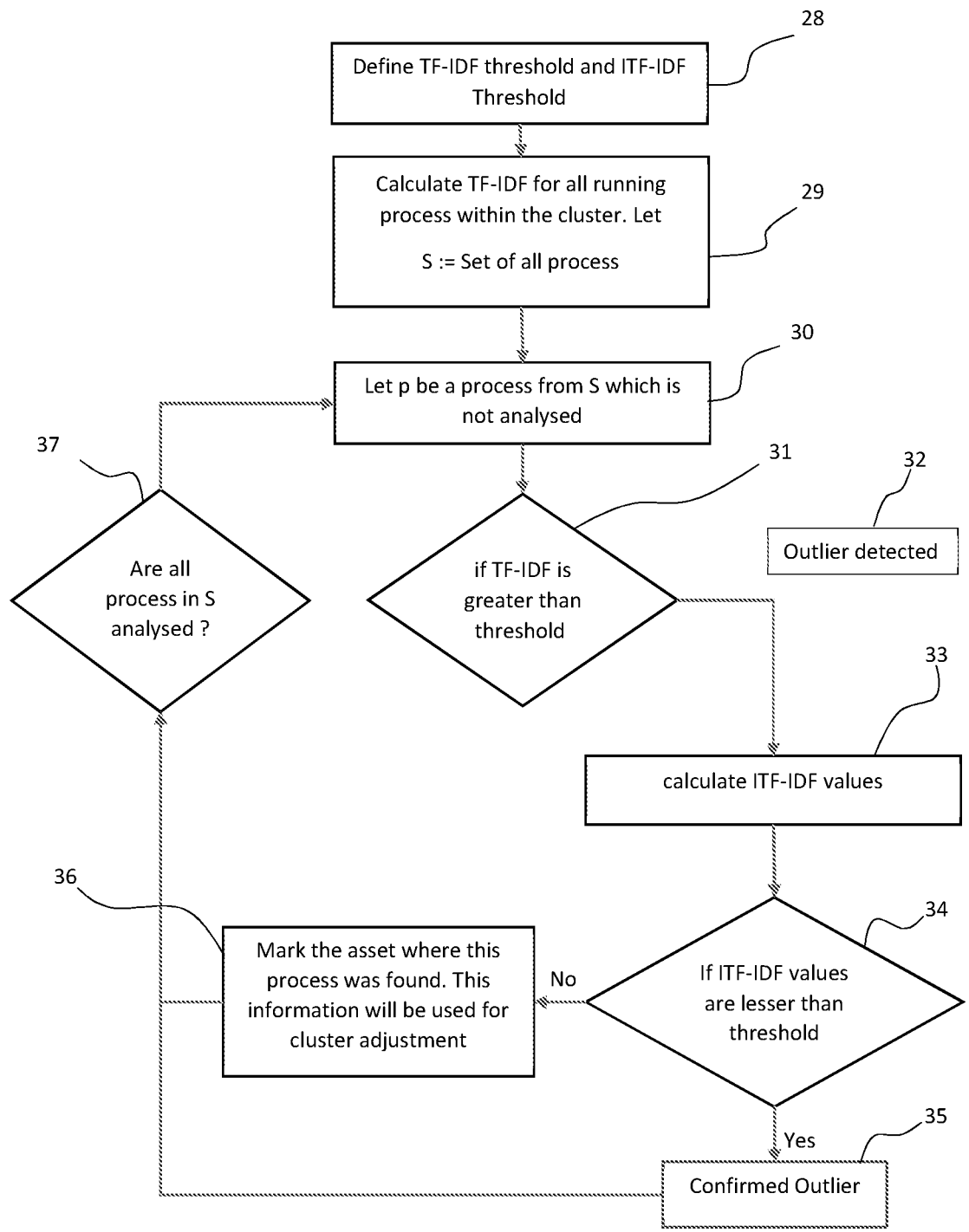
FIG. 5 is a flowchart depicting the outlier detection stage, according to one or more embodiments of the invention.

The second stage of detecting outliers is described on FIG. 5, according to one or more embodiments of the invention.

The user can define the TF-IDF threshold and ITF-IDF Threshold at step 28. TF-IDF for all running process within each cluster are calculated at step 29.

At step 30, an iterative method is carried out for each process p of the set of all process S, by way of at least one embodiment.

At step 31, if TF-IDF is greater than the defined threshold, the process p is considered at outlier at step 32. Then, itf-idf value is calculated at step 33. A check is made if ITF-IDF values are lesser than the threshold at step 34. If yes, the outlier is confirmed at step 35. If not, the asset where this process was found is marked at step 36. This information will be used for cluster adjustment.

At step 37, it is checked if all processes have been analyzed. If not, a new process is analyzed at step 30.

At least one embodiment of the invention is a system and algorithm of adaptive clustering which:
1. does not requires 30 days of training data and can start by analyzing day one forensic snapshot.
2. is capable of handling variance in software usage by specialized teams.
3. is capable to reducing false positives on the go.

Numerous variations and modifications will become apparent to those skilled in the art once the above disclosure is fully appreciated.

What is claimed is:

1. A method for detecting outliers in processes running in a group of machines, wherein the method is carried out by a computer and the method comprising:
   a clustering stage carried out at a first frequency and comprising
      fetching a list of software contained in all machines of said group of machines,
      calculating a term frequency-inverse document frequency (tf-idf) value for each installed software of said list of software and for each machine of said all machines,
      performing clustering of the all machines by applying a clustering algorithm and using a Jaccardian weighted distance method between said all machines based on the tf-idf value that is calculated for each installed software of said list of software and for said each machine of said all machines, to form clusters,
   a preliminary outliers detection stage carried out at a second frequency to detect outliers, the second frequency being greater than the first frequency, and said preliminary outliers detection stage comprising
      fetching information of processes running in the all machines,
      for each cluster of said clusters, calculating tf-idf values for each process of said processes,
         wherein if a tf-idf value of a process of said each process is greater than a first predetermined threshold, the process is considered as an outlier,
      for all of said clusters, calculating an itf-idf value for said each process that is considered as said outlier to identify a false positive or confirm said outlier,
         wherein if said itf-idf value is lower than a second predetermined threshold, the process is confirmed as said outlier;
   wherein when confirming said outlier, via said clustering stage and said preliminary outliers detection stage, said method further comprises
      choosing a right cluster of said clusters by calculating fitment for other clusters if said false positive is confirmed, by starting analysis of a day one forensic snapshot to detect malware, in order to
         reduce false positives on the go due to large software variance of said processes.

2. The method according to claim 1, wherein, for said each installed software or said each process and a machine of said all machines in a cluster of all of said clusters, the tf-idf being a function of
   a ratio between a number of times the each installed software or said each process appears in the machine, and a total number of apparition of said list of software or said processes in the machine,
   a ratio between a total number of machines in the cluster, and a total number of machines in the cluster wherein the each installed software or the each process appears.

3. The method according to claim 1, wherein tf-idf=tf($t$)*idf($t$) with t being an installed software of said list of software or said process, tf($t$)=f($t$)/$\Sigma_t$f($t$)

f(t) being a frequency of said installed software or said process in a machine d of said all machine, and $$idf(t) = \log\left(\frac{1+n}{1+\sum_t bf(t)}\right) + 1,$$

with
   n being a total number of machines of said all machines,
   bf(t)=Boolean frequency of said installed software in said machine; wherein bf(t) is 1 if said installed software or said process is present in said machine d, 0 otherwise.

4. The method according to claim 1, wherein, for said process, the itf-idf being a function of
   a ratio between a total number of apparition of all of said processes in said all machines of all of said clusters, and a total number of apparition of said process in said all machines of all of said clusters, and
   a ratio between a total number of said all machines, and a total number of machines wherein the process appears.

5. The method according to claim 1, wherein the itf-idf is defined as

Itf-idf=if($t$)*idf($t$), with $$if(t) = \log\left(\frac{1+\sum_{t,d} f(t,d)}{1+\sum_d f(t,d)}\right) + 1,$$

with
   t being an installed software of said list of software or said process of said processes,
   d being a machine of said all machines,
   $E_{t,d}f(t,d)$ being a summation of frequencies of all of said installed software of said processes found in said all machines,
   $\Sigma_d f(t \cdot d)$ being summation of frequency of said installed software or said process t in said all machines, $$idf(t) = \log\left(\frac{1+n}{1+\sum_t bf(t)}\right) + 1,$$

with
   n being the total number of said all machines,
   bf(t)=Boolean frequency of said installed software or said process t in said machine d; wherein said bf(t) is 1 if said installed software or said process is present in said machine d, 0 otherwise.

6. The method according to claim 1, wherein the fetching is carried out by a local agent installed in said each machine.

7. The method according to claim 1, wherein the installed software list comprises a low volatile information of installed software, services or scheduled tasks.

8. The method according to claim 1, wherein the second frequency is a real time frequency.

9. The method according to claim 1, wherein the clustering algorithm is a density-based spatial clustering of applications with noise (DBSCAN) algorithm, an OPTICS algorithm or K-Means algorithm.

10. The method according to claim 1, wherein the method further comprises, when said process is considered as said outlier is not confirmed as said outlier, a feedback loop is provided comprising calculating a fitment for said each cluster,
moving the machine to another cluster having better fit than a current cluster of said each cluster.

11. The method according to claim 10, wherein said calculating said fitment for said each cluster comprises calculating a term frequency weight for said each process in the each cluster, the term frequency weight being a number of machines where the process is observed divided by a total number of machines in the each cluster,
for said each machine in the each cluster, calculating a match score which is a sum of term frequency weights of all of said processes running in the each machine,
calculating a cluster match score which is an average of match scores of said all machines of the each cluster,
for said each machine, testing inclusion of said each machine in said another cluster by calculating a feature match score which is the sum of term frequency weights of all of said processes running in the each machine and also running in said another cluster,
if the feature match score is above or equal to the cluster match score of said another cluster, the each machine is moved to the said another cluster only if a difference between the match score of the each machine in the current cluster of said each cluster and the cluster match score of the current cluster is greater than a distance between the feature match score that is calculated and the match score of said another cluster.

12. The method according to claim 1, wherein the Jaccardian weighted distance method is defined as If $x=(x1, x2, \ldots, xn)$ and $y=(y1, y2, \ldots, yn)$ are two vectors with all real $xi$, $yi \geq 0$ then their Jaccard weighted distance is defined as $$J_w(x, y) = 1 - \frac{\sum_i \min(x_i, y_i)}{\sum_i \max(x_i, y_i)}.$$

13. A system for detecting outliers, said system comprising:

a group of machines,
a local agent installed in each machine of said group of machines,
an event collector for receiving data from all local agents of said group of machines,
a forensic repository for receiving data from the event collector,
an analysis engine for running a method for detecting outliers in processes running in a group of machines based on data contained in the forensic repository, wherein the method is carried out by a computer and the method comprises a clustering stage carried out at a first frequency to form clusters and comprising fetching a list of software contained in all machines of said group of machines,
calculating a term frequency-inverse document frequency (tf-idf) value for each installed software of said list of software and for each machine of said all machines,
performing clustering of the all machines by applying a clustering algorithm and using a Jaccardian weighted distance method between said all machines based on the tf-idf value that is calculated for each installed software of said list of software and for said each machine of said all machines,
a preliminary outliers detection stage carried out at a second frequency, the second frequency being greater than the first frequency, and said preliminary outliers detection stage comprising
fetching information of processes running in the all machines,
for each cluster, calculating tf-idf values for each process of said processes,
wherein if a tf-idf value of a process of said each process is greater than a first predetermined threshold, the process is considered as an outlier,
for all of said clusters, calculating an itf-idf value for said each process that is considered as said outlier,
wherein if said itf-idf value is lower than a second predetermined threshold, the process is confirmed as said outlier,
wherein when confirming said outlier, via said clustering stage and said preliminary outliers detection stage, said method further comprises
choosing a right cluster of said clusters by calculating fitment for other clusters if said false positive is confirmed, by starting analysis of a day one forensic snapshot to detect malware, in order to
reduce false positives on the go due to large software variance of said processes, and
an agent controller for sending instructions to the all local agents to collect data in response to an order from the analysis engine.

14. A non-transitory computer-readable storage medium including a computer program encoded with computer-executable instructions which, when executed, perform a method for detecting outliers in processes running in a group of machines, wherein the method is carried out by a computer, and the method comprises:

a clustering stage carried out at a first frequency to form clusters and comprising
fetching a list of software contained in all machines of said group of machines,
calculating a term frequency-inverse document frequency (tf-idf) value for each installed software of said list of software and for each machine of said all machines,
performing clustering of the all machines by applying a clustering algorithm and using a Jaccardian weighted distance method between said all machines based on the tf-idf value that is calculated for each installed software of said list of software and for said each machine of said all machines, a preliminary outliers detection stage carried out at a
   second frequency, the second frequency being greater
   than the first frequency, and said preliminary outliers
   detection stage comprising
   fetching information of processes running in the all
      machines,
   for each cluster, calculating tf-idf values for each
      process of said processes,
      wherein if a tf-idf value of a process of said each
         process is greater than a first predetermined
         threshold, the process is considered as an outlier,
   for all of said clusters, calculating an itf-idf value for
      said each process that is considered as said outlier,
      wherein if said itf-idf value is lower than a second
         predetermined threshold, the process is confirmed
         as said outlier,
wherein when confirming said outlier, via said clustering
   stage and said preliminary outliers detection stage, said
   method further comprises
   choosing a right cluster of said clusters by calculating
      fitment for other clusters if said false positive is
      confirmed, by starting analysis of a day one forensic
      snapshot to detect malware, in order to
      reduce false positives on the go due to large software
         variance of said processes.

\* \* \* \* \*